United States Patent [19]

Kokkonen et al.

[11] Patent Number: 4,919,158

[45] Date of Patent: Apr. 24, 1990

[54] METHOD AND APPARATUS FOR WASHING PULP

[75] Inventors: Seppo K. Kokkonen; Harri T. Qvintus, both of Savonlinna, Finland

[73] Assignee: A. Ahlstrom Corporation, Karhula, Finland

[21] Appl. No.: 28,273

[22] Filed: Mar. 20, 1987

[30] Foreign Application Priority Data

Mar. 20, 1986 [FI] Finland .................................. 861167

[51] Int. Cl.$^5$ ........................... B08B 1/04; B08B 3/02
[52] U.S. Cl. ......................................... 134/15; 8/156;
160/55; 160/57; 160/60; 210/210; 210/211;
210/215; 210/216; 210/217; 210/297; 210/327;
210/366; 210/409; 210/411; 210/772
[58] Field of Search .................. 134/15; 210/386, 401,
210/402, 772, 210, 211, 215, 216, 217, 297, 327,
366, 409, 411; 8/156; 162/60, 55, 57

[56] References Cited

U.S. PATENT DOCUMENTS

| | | | |
|---|---|---|---|
| 2,753,766 | 7/1956 | Simpson | 210/217 |
| 3,229,815 | 1/1966 | Mathewson | 210/217 |
| 3,915,865 | 10/1975 | Haji et al. | 210/386 |
| 4,154,644 | 5/1979 | Ericsson | 162/60 |
| 4,156,384 | 5/1973 | Hinds, Jr. et al. | 210/386 |
| 4,292,123 | 9/1981 | Lintunen et al. | 162/60 |
| 4,303,323 | 12/1981 | Rupping | 210/386 |
| 4,310,424 | 1/1982 | Fremont et al. | 210/386 |
| 4,491,501 | 1/1985 | Klein | 162/60 |
| 4,502,171 | 3/1985 | Koshinen et al. | 162/60 |
| 4,539,827 | 9/1985 | Klein et al. | 162/60 |
| 4,549,415 | 10/1985 | Justus | 162/60 |

FOREIGN PATENT DOCUMENTS

| | | | |
|---|---|---|---|
| 2447419 | 8/1980 | France | 162/60 |
| 2531982 | 2/1984 | France | 162/60 |
| 53-19407 | 2/1978 | Japan | 162/60 |
| 57-133291 | 2/1981 | Japan | 162/60 |

Primary Examiner—Asok Pal
Attorney, Agent, or Firm—Toren, McGeady & Associates

[57] ABSTRACT

The present invention relates to a method and an apparatus for washing pulp according to which method the pulp is supplied onto a movable liquid-pervious support surface (2) to form a substantially continuous layer (7); and washing liquid is supplied to the pulp layer and passed in several successive washing phases through different areas of the layer in such a way that the washing liquid gradually flows in the opposite direction compared with the flow direction of the pulp layer. According to the invention the washing liquid is divided in two or more partial flows which pass alternately through different washing phases in such a way that the washing liquid which in one phase has passed through the pulp layer flows past at least the washing phase preceding it in the flow direction of the pulp layer. The apparatus of the invention preferably comprises a rotating cylinder (1) the casting surface (2) of which serves as the liquid-pervious support surface for the pulp.

6 Claims, 3 Drawing Sheets

METHOD AND APPARATUS FOR WASHING PULP

The present invention relates to a method and an apparatus for washing pulp, according to which method a substantially continuous layer of pulp is supplied onto a movable, liquid-pervious support surface and washing liquid is supplied to the pulp layer and fed through the layer in several successive washing stages and that each washing stage is further divided to two or more parallel washing phases in such a way that the washing liquid gradually flows in the opposite direction relative to the direction of movement of the layer.

A method as described above is disclosed for example by FI patent specifications no. 56564, 56865 and 71961. The washing apparatus of these specifications employs a rotating cylinder surrounded by a stationary shell, and the pulp to be washed flows in a substantially continuous web between the casing surface of the cylinder and the shell. The pulp is supplied onto the cylinder at a pre-determined inlet point and is discharged from it at an outlet point further on in the rotating direction. The washing liquid is supplied to the last washing stage close to the outlet of the pulp, from which stage the washing liquid gradually flows through successive washing stages in the direction opposite to the flow direction of the pulp and is discharged to a discharge pipe close to the pulp inlet point.

Several successive washing stages are necessary in the washing of pulp as channels are formed in the pulp layer and the washing efficiency of the washing liquid thus falls. Each stage, however, increases the time required for washing the pulp and thus reduces the capacity of the washing plant.

It is an object of the present invention to provide a method according to which the pulp still is washed in several successive stages but which improves the efficiency and the speed of the washing compared with known methods. A characteristic feature of the invention is that the washing liquid is divided into two or more partial flows which all flow through all washing stages but each partial flow goes through only one phase in each stage. Each stage consists of two or more wahsing phases. Pulp layer goes through all the washing stages and all the washing phases also.

From this washing method it follows that in the different washing phases in the same washing stage the pulp does not have the same cleanliness in each phase.

According to the invention, the washing liquid to be used can be divided for example into two partial flows each of which flows through every second washing phase so as to pass the liquid through all the successive washing stages. From the parallel washing phases the washing liquids are led separately to the previous stage, in such a way that the liquid from the dirtier phase is led to the dirtier phase in this washing stage.

The washing of pulp is according to the invention preferably carried out by a rotating cylinder the surface of which serves as the liquid-pervious support surface for the pulp. However, an apparatus in which the pulp supporting surface is disposed in a level, e.g. a horizontal movable endless wire, can be used.

The invention also relates to an apparatus for washing pulp, comprising a rotating cylinder having a liquid-pervious casing surface; a stationary shell extending in the direction of the axis of the cylinder and surrounding the cylinder so as to allow the pulp to be moved between the cylinder and the shell in a layer along said casing surface, and through which shell the washing liquid can be supplied to the pulp layer; at least one inlet pipe for the washing liquid connected to the shell close to the discharge of the washed pulp; compartments under the casing surface of the cylinder into which the washing liquid filtered through the pulp layer is collected; a valve system connected to said compartments and comprising a part rotating with the cylinder and a stationary part disposed against the cylinder; pipes or ducts which begin from said stationary part and which, during operation of the washing apparatus, communicate with the compartments of the drum and which are connected to different places in the shell surrounding the cylinder so as to feed the washing liquid during operation of the washing apparatus in successive wahsing stages and phases at said places through the pulp layer at the same time as the liquid gradually flows in the opposite direction compared with the direction of movement of the pulp; and a discharge pipe beginning from said stationary part, via which pipe the washing liquid can be discharged from the apparatus.

The apparatus of the invention is characterized in that the pipes which feed the liquid from one washing phase to another between the stationary part of the valve system and the shell surrounding the cylinder, are connected so as to divide the washing liquid in two or more partial flows which pass through different washing phases whereby a washing liquid which in one phase has passed through the pulp layer flows past at least the washing phase preceding it in the flow direction of the pulp.

BRIEF DESCRIPTION OF THE DRAWINGS

The invention is described further below, by way of example, with reference to the accompanying drawings, in which.

The washing apparatus illustrated has a rotary cylinder surrounded by a stationary shell. The cylinder and its shell are substantially similar to the ones disclosed in Finnish patent specification no. 71961. The differences are to be found mainly in the pipes between the valve system and the shell, which are described further below.

Figure 1:
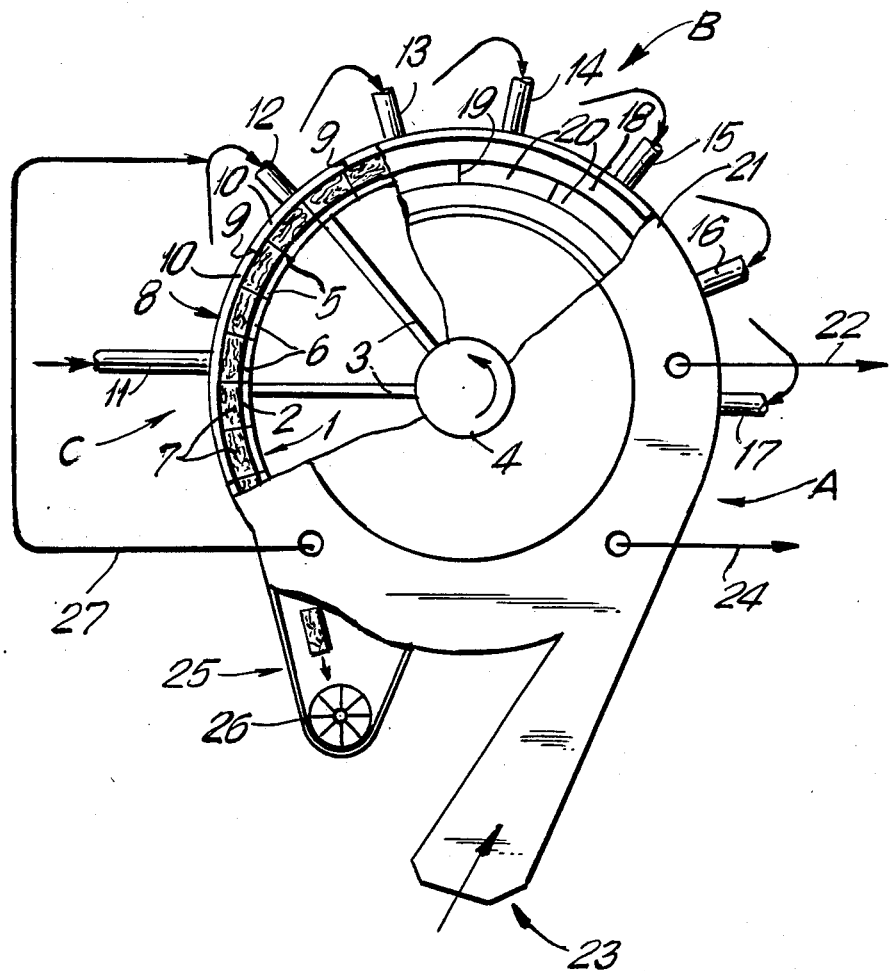
FIG. 1 is a schematical longitudinal view of a washing apparatus forming an embodiment of the invention and being in partial sections A, B and C of FIG. 3 showing different areas.
Figure 2:
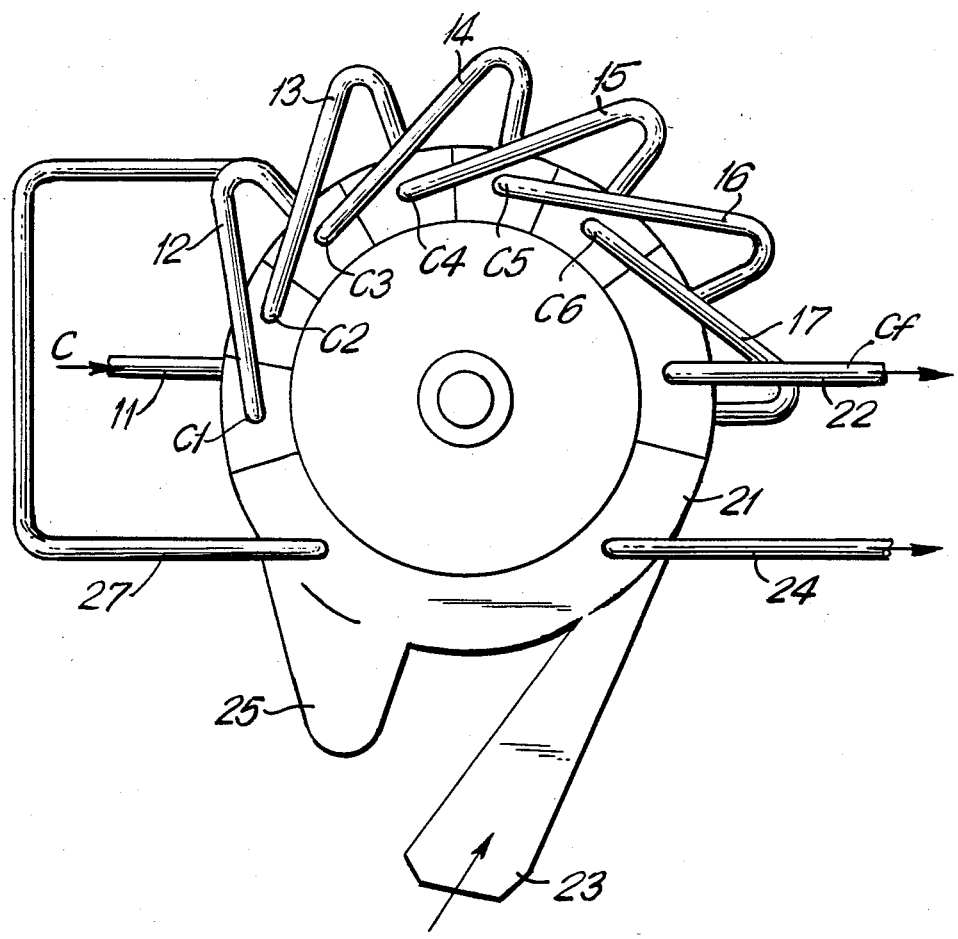
FIG. 2 is a view of one end of the apparatus of FIG. 1 from the same direction of viewing.

The disclosed apparatus comprises, as FIG. 1 shows, a cylindrical drum 1, having a casing surface 2 which is connected via radial rods 3 to a horizontal shaft 4. The casing surface 2 is preferably a liquid-pervious perforated plate. Under, i.e. radially inwardly of the casing surface 2 there are longitudinal compartments 6 which are separated from each other by intermediate walls 5 which are parallel with the shaft 4 of the drum. The bottoms of the compartments incline towards the other end of the drum which is illustrated in FIG. 2. The intermediate walls 5 extend (as shown in FIG. 1) outside, i.e. radially outwardly of the casing surface 2 of the drum so that the pulp to be washed which is supplied onto the casing surface 2, is divided into substantially rectangular strips or cakes 7.

The drum 1 which rotates around its shaft 4 in the direction indicated by the arrow in FIG. 1 is surrounded by a stationary substantially cylindrical shell 8 which extends parallel to the shaft 4 of the drum. The shell 8 has compartments 10 which are defined by intermediate walls 9 (as shown in FIG. 1) which walls are parallel with the shaft 4 of the drum, each compartment being provided with a feed pipe 11 to 17 for the liquid used for washing the pulp. The bottom of radially inward sides of the compartments 10 arranged against the pulp layer 7, which is to be washed and is supported by the casing surface 2, is made of a liquid-pervious perforated plate.

The operational principle of the apparatus of the present invention is to feed the washing liquid several times through the pulp layer 7 supplied onto the casing surface 2 of the drum with the washing liquid gradually flowing through the whole washing apparatus and progressing generally in the direction opposite to the direction of rotation of the drum. To achieve this, the apparatus is provided with a valve system at the other end of the drum 1, which system communicates via orifices with the compartments 6 under the casing surface 2 of the drum, to which compartment the washing liquid passed through the pulp layer is collected. The valve system comprises an annular part 18 which is a direct extension of the compartments 6 and is stationarily fixed with the drum 1 and rotates with it. Part 18 comprises an annular space divided by seals or intermediate walls 19 into compartments 20 so as to connect each compartment 20 with several adjacent compartments 6. Further, the valve system comprises an annular stationary part 21, which is disposed against said part 18 connected to the drum 1, and which is stationarily fixed with the shell 8 surrounding the drum 1, and from which said feed pipes 12 to 17 for the washing liquid communicating with the compartments 10 in the shell begin. Further, pipe 22 serving as the discharge pipe for the washing liquid, extends from said part 21.

Figure 3:
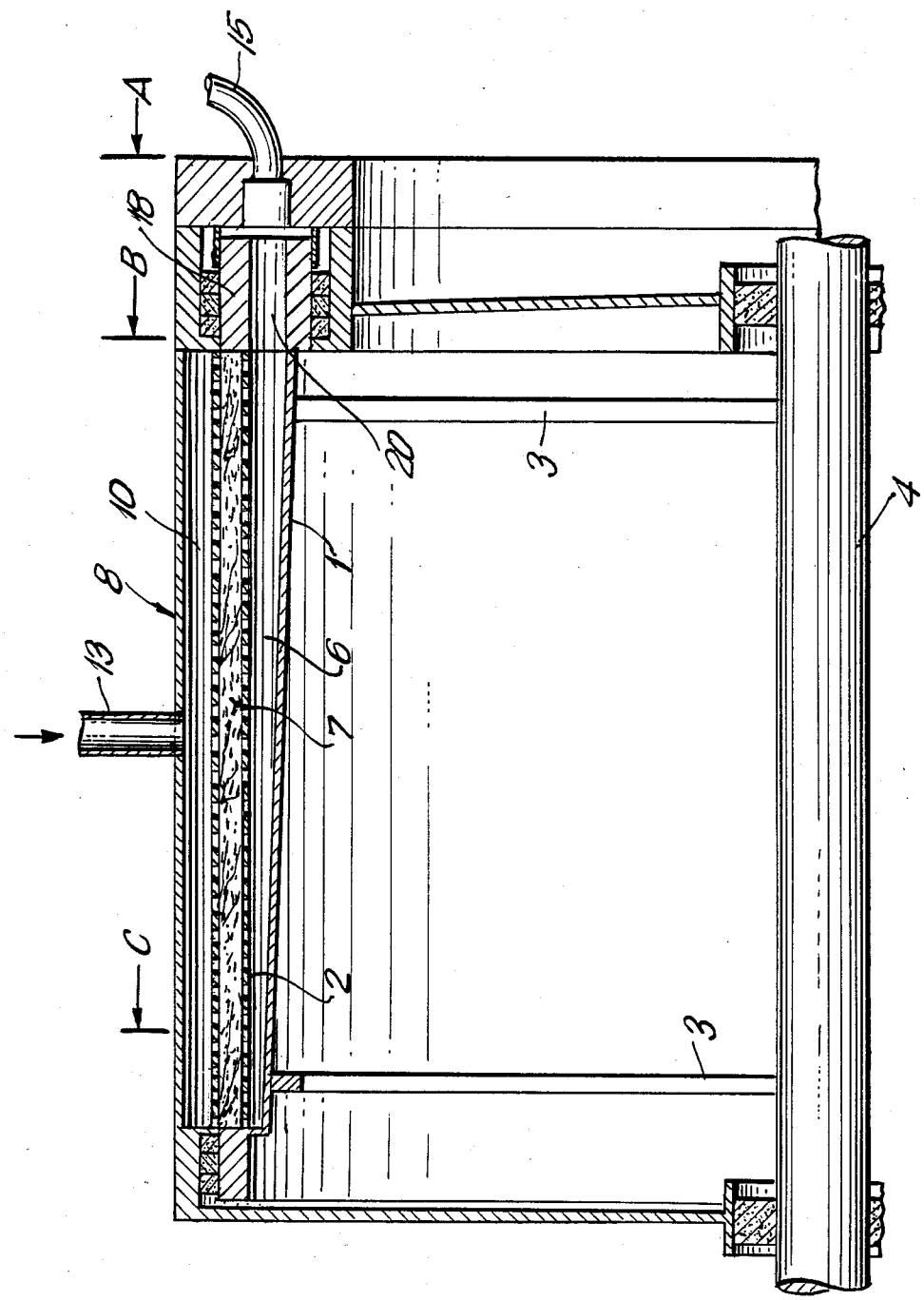
FIG. 3 is a longitudinal section of the apparatus.

FIG. 3 shows that the washing liquid coming from duct 13 is spread all over compartment 10 and flows radially inwardly through pulp 7 carried by casing surface 2 into compartment 6. The compartment 6 is inclined towards the axis of the apparatus and towards the valve arrangement where the compartment 20 is located.

The pulp to be washed in the apparatus is supplied as a fibre stock of a solids content consistency of approx. 1 to 10% through the inlet 23 onto the casing surface 2 of the drum 1. At this stage a part of the liquid contained in the stock is separated and removed by said valve system to discharge pipe 24. Thus a fibre layer 7 which solids content of approx. 8 to 12% is produced on the casing surface 2 of the drum. This layer 7 is transported by the drum 1 between the drum and the shell 8 through successive washing phases or stages to a discharge end 25 for discharge of the washed pulp and at which end the pulp is released from the surface of the drum for example pressurized air pulse and discharged to a repulper screw 26. The washing liquid removed from the pulp between the last washing phase and the pulp discharge point is guided via the valve system to a pipe 27 which guides it to a previous washing phase as described further below.

In the washing of the pulp layer 7, washing liquid is fed via the inlet pipe 11 to the compartment 10 which is closest to the pulp discharge end 25 in the shell 8. This compartment, the size of which is approximately twice the size of the other compartments 10 in the shell 8, covers the area of the two last washing phases of pulp.

The washing liquid supplied to the compartment 10 is conducted so as to flow through the perforated bottom of the compartment 10 to the pulp layer 7 and is further filtered through the casing surface 2 of the drum and flows through fibre layer 7 in that region to compartments 6 collecting the washing liquid. From the compartments 6 the washing liquid flows to two compartments 20 in the same area in the part 18 of the valve system connected to the drum. From compartments 20 the washing liquid flows further to two pipes 12 and 13 (See FIG. 2) leading from the stationary part 21 of the valve system. Thus the washing liquid is divided in two partial flows, one of which, that is the one passed (in pipe 12) through the last washing phase, is cleaner that the other one, that is the partial flow passed (in pipe 13) through the penultimate washing phase. The pipes 12 and 13 pass the partial flows of washing liquid to the two immediately preceding compartments in the shell 8, in the range of which the two preceding washing phases are carried out. As FIG. 2 shows, the washing liquid from the last washing phase, to which the washing liquid separated from the pulp after the washing phases is supplied via pipe 27, is brought in pipe 12 to the later one of said two preceding washing phases and thus it washes in that phase cleaner pulp than the more contaminated washing liquid which is received from the penultimate washing phase and is supplied via pipe 13 to the earlier one of said washing phases. After this the washing continues according to the same principle and the partial flows of washing liquid pass alternately through successive washing phases but pass through all the washing stages in such a way that the washing liquid which has in one phase passed through the pulp layer 7 flows past the washing phase immediately preceding said phase generally in the direction of movement of the pulp; thus each partial flow passes through e.g., every second washing phases. Finally, the washing liquid is collected from two first washing phases next to the pulp inlet 23 to a discharge pipe 22.

It is apparent to a person skilled in the art that the embodiments of the invention are not limited by the presented example but modifications can be made of it within the scope of protection defined by the appended patent claims. Thus, the washing liquid may be divided in three or more separate partial flows, which are brought according to the presented principle alternately to different washing phases. Also, the alternation of the partial flows of this invention need not extend to the whole washing process but can be combined for example with the method disclosed in Finnish patent no. 71961 according to which the washing liquid passes in one undivided flow from one washing stage to another. Also the construction of the apparatus used in the washing can be different from the one presented in the above example. For example a cylinder as disclosed in Finnish patent specifications no. 5,6564 and 56865 can be used, in which the compartments, disposed under the casing surface of the cylinder and collecting the washing liquid, are connected via pipes to a valve system provided immediately about the shaft of the drum.

We claim:

1. A method of washing pulp utilizing a moving liquid-pervious support surface moving in a first direction past several successive washing stages, comprising the steps of:

(a) feeding the pulp onto the moving liquid-pervious support surface in a substantially continuous layer, which layer then moves in the first direction;

(b) supplying washing liquid to the pulp layer and passing the washing liquid through the layer in the several successive washing stages which each have at least two washing phases in a manner so that the washing liquid flows generally in a second direction which is opposite to said first direction; and wherein step (b) is practiced by dividing the washing liquid into at least two partial flows which pass respectively through alternate washing phases in said second direction, the washing liquid of one flow which has passed through one washing phase passing at least the second washing phase preceding said one washing phase in said first direction.

2. A method as recited in claim 1 wherein a rotating cylinder having a casing surface which is liquid-pervious functions as the liquid-pervious support surface, and wherein step (a) is practiced by feeding the pulp onto the casing surface of the rotating cylinder.

3. A method as recited in claim 2 wherein the pulp fed in step (a) has a solids content of between about 1–10 percent.

4. A method as recited in claim 1 wherein the pulp fed in step (a) has a solid content of between about 1–10 percent.

5. A method as recited in claim 2 wherein the rotating cylinder is rotatable about a substantially horizontal axis; and wherein step (a) is practiced by feeding the pulp with both horizontal and vertical vectors onto the cylinder surface.

6. A method of washing pulp utilizing a moving liquid-pervious support surface comprising:

moving the support surface in a first direction past a plurality of washing stages successively disposed along said first direction and including at least two washing phases each;

feeding pulp onto the support surface in a substantially continuous layer, the layer moving in the first direction;

supplying washing liquid to the pulp layer at one of said washing stages near a downstream end of said support surface in said first direction, said washing liquid passing through and washing the pulp layer at said one washing stage;

dividing the washing liquid after it has passed through the pulp layer at said one washing stage into two partial flows;

passing washing liquid of one of said partial flows to a first washing phase of a first upstream washing stage which is upstream of said one washing stage;

passing washing liquid from the other of said partial flows to a second washing phase of the first upstream washing stage which is upstream of said first washing phase; and passing washing liquid respectively from said first and second washing phases to alternating and respective further washing phases of further upstream washing stages which are upstream from said first upstream washing stage whereby said washing liquid flows generally in a second direction which is opposite to said first direction along said successive washing stages.

* * * * *